Jan. 6, 1953  J. DE MILTO  2,624,394
CHILD'S VEHICLE SEAT
Filed Sept. 14, 1951
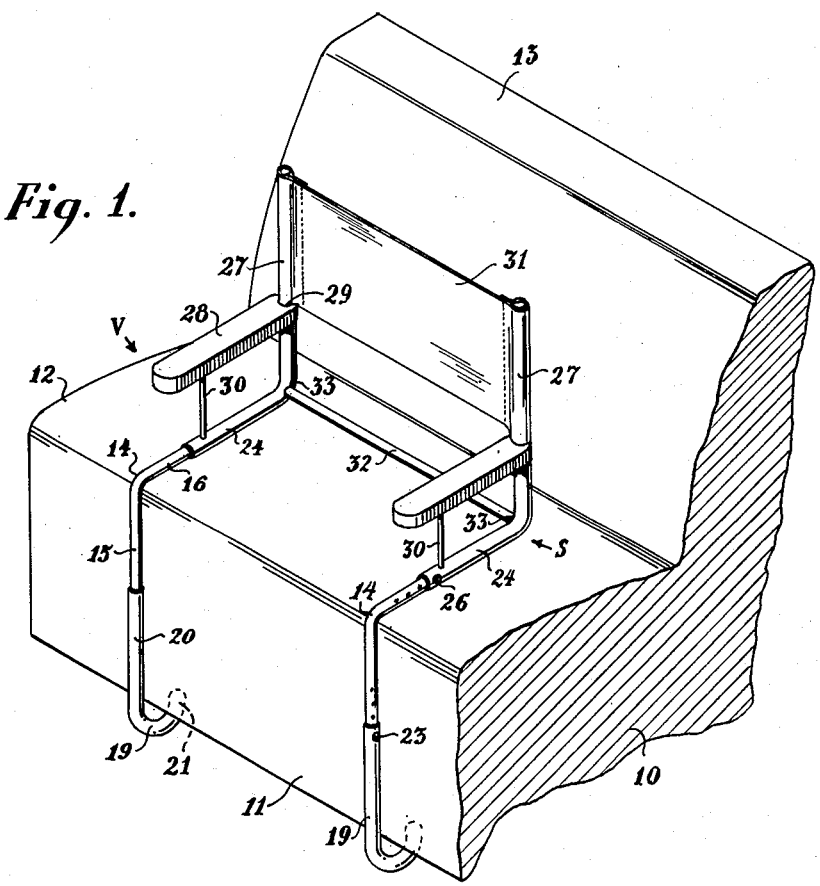
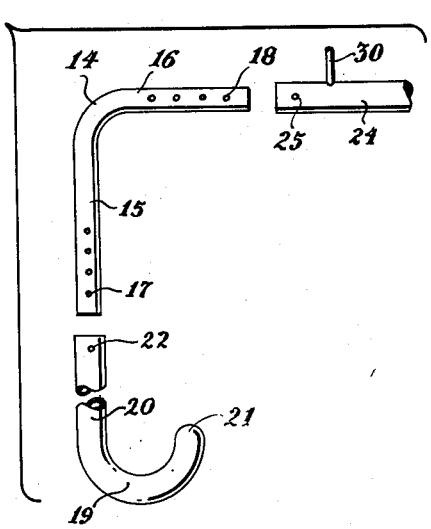
INVENTOR.
JEANNE DE MILTO
BY Potts and Bruna
Joshua R. Potts
ATTORNEYS.

Patented Jan. 6, 1953

2,624,394

UNITED STATES PATENT OFFICE 2,624,394

CHILD'S VEHICLE SEAT

Jeanne De Milto, Philadelphia, Pa.

Application September 14, 1951, Serial No. 246,594

6 Claims. (Cl. 155—133)

The present invention relates to a seat in the nature of an auxiliary seat which is intended to be applied to the conventional seat of a motor vehicle for the purpose of accommodating a child, and is concerned primarily with a seat of this type in which provision is made for seating the child directly on the vehicle seat.

The conventional automobile, as constructed today by the maufacturer, includes one or more seats which are designed primarily to accommodate adults. A child of tender years is not comfortably accommodated by such vehicle seats. This fact has long been recognized, and there have been provided seats which are intended to accommodate children. However, in most cases such auxiliary seats have been supported from the back of the motor vehicle seat, and a child, when sitting thereon, rests his back against the back of the vehicle seat, but his feet are left in a dangling condition which is generally uncomfortable.

A conventional motor vehicle seat ordinarily includes what might be called three supporting surfaces. These are: the front edge surface of the seat cushion, the top surface of the seat cushion, and the front surface of the seat back. In most of the auxiliary seats for children heretofore provided, only one of these supporting surfaces of the vehicle seat is utilized, and that is the front surface of the back. In accordance with the present invention, an auxiliary seat is provided which utilizes two of these supporting surfaces of the vehicle seat, namely, the front edge and top surfaces of the seat cushion.

An important object of the present invention is to provide an auxiliary seat of the type indicated which consists essentially of two side assemblies which are adapted to be fitted over the front edge of the vehicle seat and which carry a back which extends therebetween. Each of these side assemblies may also include a side arm support.

The size of children which use auxiliary seats of the type with which this invention is concerned, varies. Thus, if any particular child is to be comfortably accommodated, the back should be accurately positioned relative to the front edge of the vehicle seat. A certain distance between the back of the auxiliary seat and the front edge of the vehicle seat which will comfortably accommodate one child, will not serve this purpose for another child. With this condition in mind, another highly important object of the invention is to provide a child's vehicle seat of the type indicated which includes means for adjusting the position of the back relative to the front edge of the vehicle seat on which it is mounted.

The thicknesses of the seat cushions of motor vehicles vary with different manufacturers. In order to accommodate such variations in thicknesses, it is necessary that the vehicle seat be adjustable so that when applied to a seat, it will be securely mounted thereon. Thus, another object of the invention is to provide a child's vehicle seat which is adjustable to the thickness of the seat cushion of the particular vehicle seat to which it is applied.

Both of these last mentioned objects are achieved by providing in each side assembly an L-shaped or angle member which fits over the upper front edge of the vehicle seat. A tubular member having a hook at one end telescopically receives the vertical leg of the L-shaped member in each side assembly with the hook engaging the lower front edge of the seat cushion. Each side assembly also includes a tubular bottom piece which telescopically receives the horizontal leg of the L-shaped member. Provision is made for maintaining both tubular pieces which receive the legs of the L-shaped member in an adjusted position relative thereto.

Upstanding from the rear ends of the bottom pieces of the side assemblies are two vertical supports between which extends a back support which preferably takes the form of a piece of fabric. Side arm supports are carried by the horizontal bottom pieces, and the vertical supports.

Various other more detailed objects and advantages of the invention such as arise in connection with carrying out the above noted ideas in a practical embodiment will in part become apparent, and in part be hereinafter stated as the description of the invention proceeds.

The invention therefore comprises a child's vehicle seat which consists essentially of two side assemblies and a back. Each side assembly comprises an L-shaped member that fits over the upper front edge of the vehicle seat cushion and has vertical and horizontal legs. A tubular member having a hook at its free end telescopically receives the vertical leg of each of these members. A tubular bottom piece receives the horizontal piece of each L-shaped member, and upstanding from the rear end of each bottom piece is a vertical support. The back extends between these vertical supports, and side arm supports are carried by the bottom pieces and the vertical supports of the side assemblies. Means are provided for maintaining the bottom pieces and hook members in adjusted positions relative to the L-shaped members.

For a full and more complete understanding of the invention, reference may be had to the following descriptive and accompanying drawing wherein:

Figure 1 is a perspective view illustrating a portion of the vehicle seat and showing the child's vehicle seat of this invention applied thereto; and Figure 2 is a detailed perspective illustrating the L-shaped member and parts which are connected thereto of one side assembly in exploded relation.

Referring now to the drawing wherein like reference characters denote corresponding parts, and first more particularly to Figure 1, a portion of a seat of a conventional motor vehicle, is therein illustrated and referred to in its entirety by the reference character V. The seat V includes a bottom which is ordinarily referred to as the seat cushion and which is identified by the reference character 10. This seat cushion 10 has a front edge 11 and a top surface 12. Upstanding from the rear edge of the seat cushion 10 is a back 13 which is not particularly important to the present invention other than that the back of the auxiliary seat to be later described, is spaced therefrom.

The child's vehicle seat of this invention is applied to the front portion of the seat cushion 10 of the vehicle seat V, and is referred to in its entirety by the reference character S.

The seat S comprises two side assemblies which are substantial duplicates and only one of which is described in detail, as that is believed to be sufficient for the purposes of this specification.

Each side assembly includes an L-shaped or angle member 14 having a vertical leg 15 and a horizontal leg 16. Each of these L-shaped members is fitted over the upper front edge of the seat cushion 10, as illustrated in Figure 1 with the vertical leg 15 engaging the edge surface 11 and the horizontal leg 16 engaging the top surface 12. This L-shaped member 14 may be of any construction desired, either tubular or solid, and the leg 15 is shown as formed with a series of openings 17 adjacent its free end, while the leg 16 is provided with another series of openings 18 adjacent its free end. The purpose of these openings 17 and 18 will be later pointed out.

Each side assembly also includes an anchoring member 19 which comprises a tubular part 20 to which is integrally joined a hook 21. The tubular part 20 receives the vertical leg 15 and engages the front edge surface 11 of the seat cushion 10 with the hook 21 engaging the bottom of the seat cushion. Adjacent to its free end, the tubular part 20 is formed with an opening 22 which may be threaded and which is adapted to align with one of the openings 17. A peg 23 passes through these aligned openings and may have a threaded portion which is screwed into the threads of the opening 22. It is evident that this peg is effective to maintain the anchoring member 19 in an adjusted position relative to the vertical leg 15 of the L-shaped member 14. Each side assembly also includes a tubular bottom piece 24 which telescopically receives the horizontal leg 16 of the L-shaped member 14. Adjacent to its free end, the bottom piece 24 is formed with an opening 25 which may be threaded and which is adapted to align with one of the openings 18. A peg 26 passes through these aligned openings and may have a threaded portion which is screwed into the threads of the opening 25.

It is evident that with the peg 26 in position, the bottom piece 24 is maintained in an adjusted position relative to the vertical leg 16 of the L-shaped member 14.

Upstanding from the rear end of each bottom piece 24 and preferably formed integrally therewith is a vertical support 27. A side arm support is shown at 28. This side arm support extends forwardly of the vertical support 27 at an appropriate height above the bottom piece 24 and has one end joined to the vertical support 27 in any preferred manner such as by welding, the joint being indicated at 29. A brace for the side arm support 28 is shown at 30 and extends upwardly from the bottom piece 24.

A back is represented at 31 and is shown as extending between the vertical supports 27. This back may be of any material desired, although the invention has particularly in mind the use of a fabric which may be secured to the vertical supports 27 in any preferred manner such as by having its edges turned back to form loops which receive the vertical supports.

The side assemblies are maintained in a desired spaced relation by a crosspiece 32 which is preferably located at the joinders of the bottom pieces 24 and vertical supports 27. The ends of the crosspiece 32 may be secured to the side assemblies in any preferred manner such as by being welded thereto. These joints are represented at 33.

While the manner of using the child's vehicle seat above described is believed to be obvious from the illustration of the drawing and the description of the parts given it may be briefly outlined as follows:

The anchoring members 19 are first adjusted on the legs 15 to accommodate the thickness of the seat cushion 10 of the particular vehicle seat on which the seat S is to be installed. This adjustment is achieved by first removing the pegs 23 and telescoping the legs 15 in the tubular parts 20 the required distance to bring one of the openings 17 of each leg into alignment with the opening 22 of the tubular part 20. The pegs 23 are now replaced to maintain the adjustment. This adjustment may be carried out either before or after the seat S is supplied to the vehicle seat V. Once the adjustment has been made the seat S may be removed and replaced without further adjustment.

The bottom pieces 24 are also adjusted relative to the horizontal legs 16 to locate the back 31 the required distance from the front surface 11 of the seat 10. When the pegs 26 are positioned, this adjustment will be maintained.

A child may now sit on the top surface 12 of the seat cushion 10 between the side assemblies and be comfortably accommodated by the back 31 and side arm supports 28.

The seat S may be easily removed by simply imparting an upward and forward motion to the vertical supports 27 or back 31.

While a preferred specific embodiment of the invention is hereinbefore set forth, it is to be clearly understood that the invention is not to be limited to the exact constructions, mechanisms and devices illustrated and described, because various modifications of these details may be provided in putting the invention into practice within the purview of the appended claims.

What is claimed is:

1. In a child's vehicle seat, a pair of side assemblies, a crosspiece connected to and extending between said side assemblies, each of said side assemblies including an L-shaped member adapted to fit over the upper front edge of a vehicle seat cushion and including a vertical leg and a horizontal leg, and anchoring member adjustably secured to each vertical leg, a bottom piece adjustably secured to each horizontal leg, a vertical support upstanding from the end of each bottom piece remote from its attachment to said vertical leg, and a back extending between and carried by said vertical supports.

2. In a child's vehicle seat, a pair of side assemblies, a crosspiece connected to and extending between said side assemblies, each of said side assemblies including an L-shaped member adapted to fit over the upper front edge of a vehicle seat cushion and having a vertical leg and a horizontal leg, an anchoring member having a tubular part telescopically receiving the vertical leg of each of said L-shaped members and having a hook integrally joined to the opposite end thereof, means for maintaining said anchoring members in an adjusted position relative to said L-shaped members, a vertical support upstanding from the end of each bottom piece remote from said L-shaped members, and a back supported by and extending between said vertical supports.

3. In a child's vehicle seat, a pair of side assemblies, a crosspiece connected to and extending between said side assemblies, each of said side assemblies including an L-shaped member adapted to fit over the upper front edge of a vehicle seat cushion and having a vertical leg and a horizontal leg, an anchoring member having a tubular part telescopically receiving the vertical leg of each of said L-shaped members and having a hook integrally joined to the opposite end thereof, means for maintaining said anchoring members in an adjusted position relative to said L-shaped members, a tubular bottom piece telescopically receiving the horizontal leg of each L-shaped member, means for maintaining said bottom pieces in an adjusted position relative to said L-shaped members, a vertical support upstanding from the end of each bottom piece remote from said L-shaped members, a back supported by and extending between said vertical supports, and a side arm support included in each side assembly and carried by the bottom piece and vertical support of that side assembly.

4. In a child's vehicle seat, a pair of side assemblies, a crosspiece connected to and extending between said side assemblies, each of said side assemblies including an L-shaped member adapted to fit over the upper front edge of a vehicle seat cushion and having a vertical leg and a horizontal leg, a pair of anchoring members having a hook at one end, a telescopic joint between the other end of each anchoring member and one of said vertical legs, a pair of bottom pieces, a telescopic joint between one end of each bottom piece and one of said horizontal legs, a vertical support upstanding from the other end of each bottom piece, and a back carried by and extending between said vertical supports.

5. In a child's vehicle seat, a pair of side assemblies, a crosspiece connected to and extending between said side assemblies, each of said side assemblies including an L-shaped member adapted to fit over the upper front edge of a vehicle seat cushion and having a vertical leg and a horizontal leg, a pair of anchoring members having a hook at one end, a telescopic joint between the other end of each anchoring member and one of said vertical legs, a pair of bottom pieces, a telescopic joint between one end of each bottom piece and one of said horizontal legs, a vertical support upstanding from the other end of each bottom piece and integrally joined thereto, a fabric back carried by and extending between said vertical supports, a side arm support extending forwardly from each vertical support and connected thereto, and a brace for each side arm support extending upwardly from each bottom piece.

6. In a child's vehicle seat, a pair of side assemblies, a crosspiece connected to and extending between said side assemblies, each of said side assemblies including an L-shaped member adapted to fit over the upper front edge of a vehicle seat cushion and having a vertical leg and a horizontal leg, a pair of anchoring members having a hook at one end, a telescopic joint between the other end of each anchoring member and one of said vertical legs, means for maintaining said anchoring members in an adjusted position relative to said L-shaped members, a pair of bottom pieces, a telescopic joint between one end of each bottom piece and one of said horizontal legs, means for maintaining said bottom pieces in an adjusted position relative to said L-shaped members, a vertical support upstanding from the other end of each bottom piece and integrally joined thereto, a fabric back carried by and extending between said vertical supports, a side arm support extending forwardly from each vertical support and connected thereto, and a brace for each side arm support extending upwardly from each bottom piece.

JEANNE DE MILTO.

REFERENCES CITED

The following references are of record in the file of this patent:

UNITED STATES PATENTS

| Number | Name | Date |
|---|---|---|
| 1,809,392 | Ponten et al. | June 9, 1931 |
| 2,308,315 | Smith | Jan. 12, 1943 |
| 2,480,310 | Torrey | Aug. 30, 1949 |
| 2,491,784 | Thompson | Dec. 20, 1949 |
| 2,529,532 | Abbott et al. | Nov. 14, 1950 |